United States Patent
Ravise et al.

(10) Patent No.: US 12,106,744 B2
(45) Date of Patent: Oct. 1, 2024

(54) METHOD FOR MANUFACTURING AN ACOUSTIC ABSORPTION STRUCTURE, AND ACOUSTIC ABSORPTION STRUCTURE OBTAINED IN THIS WAY

(71) Applicant: Airbus Operations SAS, Toulouse (FR)

(72) Inventors: Florian Ravise, Toulouse (FR); Théo Riccobene, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 170 days.

(21) Appl. No.: 17/685,594

(22) Filed: Mar. 3, 2022

(65) Prior Publication Data
US 2022/0293077 A1  Sep. 15, 2022

(30) Foreign Application Priority Data
Mar. 10, 2021 (FR) .................................. 2102317

(51) Int. Cl.
*B32B 3/12* (2006.01)
*B32B 5/18* (2006.01)
(Continued)

(52) U.S. Cl.
CPC .............. *G10K 11/168* (2013.01); *B32B 3/12* (2013.01); *B32B 5/18* (2013.01);
(Continued)

(58) Field of Classification Search
CPC ....... B32B 3/12; B32B 5/18; B32B 2307/102; B32B 2307/416; B32B 2605/18; F02C 7/24
See application file for complete search history.

(56) References Cited

U.S. PATENT DOCUMENTS 3,952,831 A * 4/1976 Bernard ............... G10K 11/172
181/292
6,274,216 B1 * 8/2001 Gonidec .................. B32B 5/02
428/116
(Continued)

FOREIGN PATENT DOCUMENTS

FR 3082987 A1 12/2019
FR 3090471 A1 6/2020

OTHER PUBLICATIONS

English translation of FR 3082987 A1, accessed Oct. 16, 2023 via Espacenet, <https://translationportal.epo.org/emtp/translate?ACTION=description-retrieval&COUNTRY=FR&ENGINE=google&FORMAT=docdb&KIND=A1&LOCALE=en_EA&NUMBER=3082987&OPS=ops.epo.org%2F3.2&SRCLANG=fr&TRGLANG=en&apikey=TSMqTfrVAvNtryGI8QIfbozj> (Year: 2019).*
(Continued)

*Primary Examiner* — Jeremy A Luks
(74) *Attorney, Agent, or Firm* — Greer, Burns & Crain, Ltd.

(57) ABSTRACT

A method for manufacturing an acoustic absorption structure comprising a plurality of acoustic elements, each of which is positioned in one of the cells of a cellular panel. The method includes a step of manufacturing acoustic elements provided with at least two radial tongues, a step of manufacturing a cellular panel provided with slots configured to accommodate the radial tongues of each acoustic element, a step of force-fitting each acoustic element in one of the cells of the cellular panel until the radial tongues are accommodated in the slots. An acoustic absorption structure obtained using this method is provided.

6 Claims, 4 Drawing Sheets

(51) Int. Cl.
*F02C 7/24* (2006.01)
*G10K 11/168* (2006.01)
*B64C 7/02* (2006.01)

(52) U.S. Cl.
CPC ... *B32B 2307/102* (2013.01); *B32B 2307/416* (2013.01); *B32B 2605/18* (2013.01); *B64C 7/02* (2013.01); *F02C 7/24* (2013.01)

(56) References Cited

U.S. PATENT DOCUMENTS

| | | |
|---|---|---|
| 10,280,839 B2 * | 5/2019 | Riou ................ F02C 7/045 |
| 2002/0050420 A1 | 5/2002 | Porte et al. |
| 2012/0285768 A1 | 11/2012 | Douglas et al. |
| 2015/0041247 A1 | 2/2015 | Ichihashi |
| 2019/0213990 A1 | 7/2019 | Jonza et al. |
| 2020/0202830 A1 | 6/2020 | Brossard et al. |

OTHER PUBLICATIONS

French Search Report; priority document.

* cited by examiner

METHOD FOR MANUFACTURING AN ACOUSTIC ABSORPTION STRUCTURE, AND ACOUSTIC ABSORPTION STRUCTURE OBTAINED IN THIS WAY

CROSS-REFERENCES TO RELATED APPLICATIONS

This application claims the benefit of the French patent application No. 2102317 filed on Mar. 10, 2021, the entire disclosures of which are incorporated herein by way of reference.

FIELD OF THE INVENTION

The present application relates to a method for manufacturing an acoustic absorption structure, and to an acoustic absorption structure obtained in this way.

BACKGROUND OF THE INVENTION

According to a first embodiment described in the document FR-3 090 471, an acoustic absorption structure comprises a porous layer in contact with a medium in which sound waves propagate, a cellular panel, a reflective layer, and a plurality of acoustic elements. Each of them comprises a capsule closed by the porous layer, in which there is positioned a hollow cone forming a first cavity with the capsule and a second cavity with the porous layer. This hollow cone has at least one acoustic orifice, making it possible to place the first and second cavities in communication, this orifice being positioned and dimensioned in accordance with the desired acoustic characteristics.

According to one configuration, the cellular panel is a honeycomb panel which has a first face, at which the porous layer is positioned, and a second face, at which the reflective layer is positioned.

In the remainder of the description, a transverse plane is a plane parallel to the first face of the cellular panel. A longitudinal direction is a direction perpendicular to the first face of the cellular panel. A height is a dimension taken parallel to the longitudinal direction from the first face. The height of the cellular panel corresponds to the distance between the first and second faces.

The acoustic elements are positioned in housings which pass through the cellular panel, each housing corresponding to a cell of the honeycomb panel. Each acoustic element has a section adapted to that of the cell and a height substantially equal to the height of the honeycomb panel in order to be correctly immobilized in the cell of the honeycomb panel that receives it.

An acoustic absorption structure formed in this way, based on the same principle as a Helmholtz resonator and a quarter wave resonator, makes it possible to effectively attenuate low-frequency sounds emitted by a turbomachine of the UHBR type.

This first embodiment makes it easier to position the acoustic elements in the honeycomb panel, and so this operation can be automated.

However, this first embodiment is not optimal since it results in a significant increase in the on-board mass on account of the presence of a capsule for each of the acoustic elements.

According to a second embodiment, for each acoustic element, the cone is directly positioned in a cell of the honeycomb panel such that the cone and the walls of the cell delimit the first cavity. Thus, on the acoustic plane, the capsule is replaced by the walls of the cell.

This second embodiment makes it possible to reduce the on-board mass compared with the first embodiment. However, it is not entirely satisfactory since it is difficult to position the cones in the cells in a given position and this cannot be automated.

The present invention aims to overcome all or some of the drawbacks of the prior art.

SUMMARY OF THE INVENTION

To this end, a subject of the invention is a method for manufacturing an acoustic absorption structure comprising:
 a cellular panel having first and second faces and cells delimited by peripheral partitions,
 a porous layer positioned at the first face of the cellular panel,
 a reflective layer,
 a plurality of acoustic elements, each positioned in one of the cells of the cellular panel, each acoustic element having a body which has a first peripheral edge configured to cooperate with the peripheral partitions of the cell in which the acoustic element is positioned in order to divide the cell into two cavities, the body having at least one acoustic orifice for placing the two cavities in communication.

According to the invention, the body of each acoustic element comprises at least two radial tongues, protruding from the first peripheral edge, which extend in a radial direction substantially parallel to the first face of the cellular panel. In addition, each cell accommodating an acoustic element comprises, for each radial tongue, a slot configured to receive a radial tongue. The method for manufacturing the acoustic absorption structure comprises a step of manufacturing acoustic elements provided with at least two radial tongues, a step of manufacturing a cellular panel provided with slots configured to accommodate the radial tongues of each acoustic element, a step of force-fitting each acoustic element into one of the cells of the cellular panel until the radial tongues are accommodated in the slots.

This manufacturing method makes it possible to use robots to fit the acoustic elements in the cellular panel, while limiting the on-board mass.

According to another feature, the method comprises a step of depositing a bead connecting the first peripheral edge and the peripheral partitions of the cell for each acoustic element.

According to another feature, the method comprises a step of cutting slots in laid-flat strips of material and then steps of stacking, connecting and expanding the strips of material to obtain the cellular panel.

According to another feature, the acoustic elements positioned in two adjacent cells are offset with respect to one another in a longitudinal direction perpendicular to the first face of the cellular panel.

According to another feature, the cells have hexagonal sections, and each acoustic element comprises two diametrically opposite radial tongues.

According to another feature, the acoustic absorption structure comprises first, second and third sets of acoustic elements, the acoustic elements of one and the same set all being positioned at the same height and having radial tongues oriented in the same direction, the acoustic elements of two different sets being positioned at different heights and their radial tongues being oriented in different directions, the acoustic elements being positioned such that the acoustic elements of one and the same set are not positioned in adjacent cells.

A further subject of the invention is an acoustic absorption structure obtained using the manufacturing method according to one of the above features, the acoustic absorption structure comprising:
- a cellular panel having first and second faces and cells delimited by peripheral partitions,
- a porous layer positioned at the first face of the cellular panel,
- a reflective layer,
- a plurality of acoustic elements each positioned in one of the cells of the cellular panel, each acoustic element having a body that has a first peripheral edge configured to cooperate with the peripheral partitions of the cell in which the acoustic element is positioned in order to divide the cell into two cavities, the body having at least one acoustic orifice for placing the two cavities in communication.

According to the invention, the body of each acoustic element comprises at least two radial tongues, protruding from the first peripheral edge, which extend in a radial direction substantially parallel to the first face of the cellular panel. In addition, each cell accommodating an acoustic element comprises, for each radial tongue, a slot designed to accommodate one of the radial tongues of the acoustic element.

According to another feature, the acoustic absorption structure comprises, for each acoustic element, a bead connecting the first peripheral edge and the peripheral partitions of the cell.

According to another feature, the acoustic elements positioned in two adjacent cells are offset with respect to one another in a longitudinal direction perpendicular to the first face of the cellular panel.

According to another feature, the cells have hexagonal sections, and each acoustic element comprises two diametrically opposite radial tongues.

According to another feature, the acoustic absorption structure comprises first, second and third sets of acoustic elements, the acoustic elements of one and the same set all being positioned at the same height and having radial tongues oriented in the same direction, the acoustic elements of two different sets being positioned at different heights and their radial tongues being oriented in different directions, the acoustic elements being positioned such that the acoustic elements of one and the same set are not positioned in adjacent cells.

BRIEF DESCRIPTION OF THE DRAWINGS

Further features and advantages will become apparent from the following description of the invention, this description being given only by way of example, with reference to the appended drawings, in which.

DETAILED DESCRIPTION OF THE PREFERRED EMBODIMENTS

Figure 1:
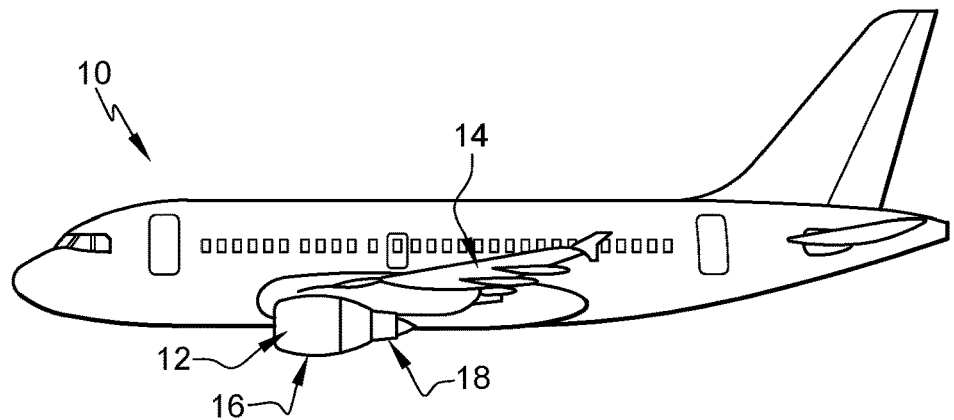
FIG. 1 is a side view of an aircraft.

FIG. 1 shows an aircraft 10 which has propulsion units 12 fixed under its wings 14. Each propulsion unit 12 comprises a nacelle 16 and a turbomachine 18 positioned inside the nacelle 16.

Figure 2:
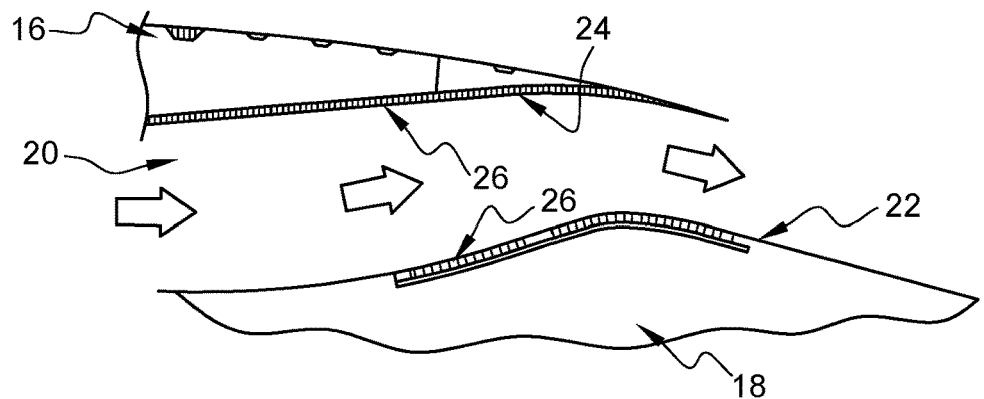
FIG. 2 is a perspective view of a primary exhaust duct comprising an acoustic absorption structure which illustrates one application of the invention.

According to one embodiment, shown in FIG. 2, the propulsion unit 12 comprises a secondary exhaust duct 20 channeling a secondary air flow, which is delimited by an interior wall 22 (also known as an inner fixed structure, or IFS) and by an exterior wall 24 (also known as an outer fixed structure, or OFS).

According to one configuration, the interior wall 22 or the exterior wall 24 comprises an acoustic absorption structure 26 (also known as an acoustic panel).

Although it is described applied to a secondary exhaust duct 20, the invention is not limited to this application. Thus, the acoustic absorption structure 26 may be positioned at any surface in contact with a medium in which sound waves propagate during operation, such as a lip and a duct of an air inlet of an aircraft nacelle, a fan casing of an aircraft nacelle or any other surface of a propulsion unit 12, for example. Regardless of the configuration, the propulsion unit 12 comprises at least one acoustic absorption structure 26.

Figure 7:
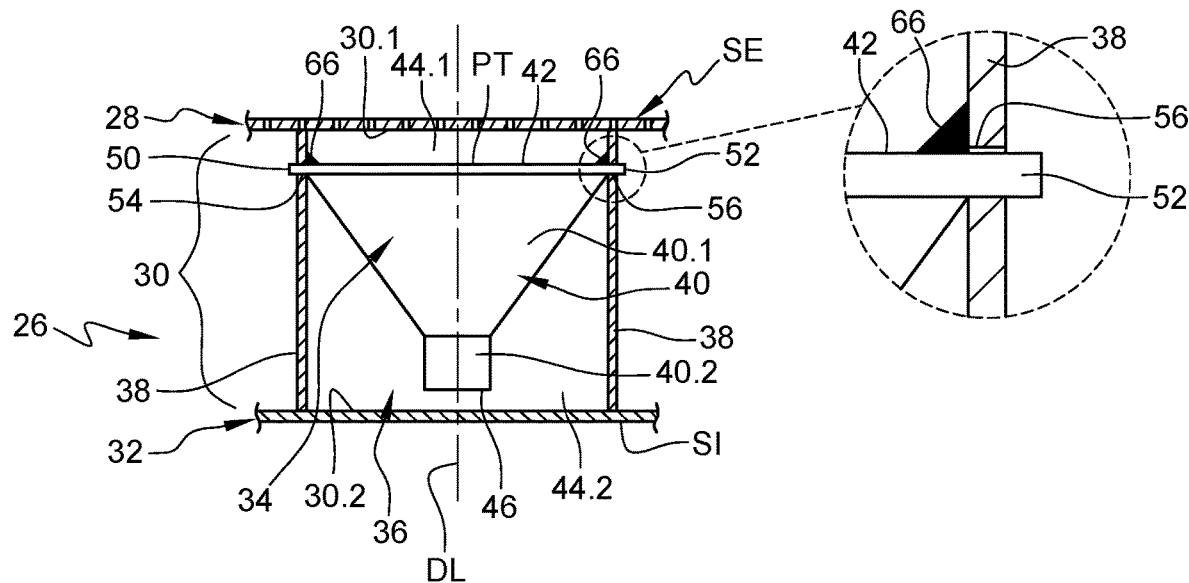
FIG. 7 is a cross section through a part of an acoustic absorption structure illustrating one embodiment of the invention.

According to one embodiment, shown in FIG. 7, the acoustic absorption structure 26 has an exterior surface SE in contact with a medium in which sound waves propagate during operation, and an interior surface SI on the opposite side from the exterior surface SE. The acoustic absorption structure 26 comprises, from the exterior layer SE to the interior layer SI, a porous layer 28 (also known as a resistive layer), one face of which forms the exterior surface SE, at least one cellular panel 30, a reflective layer 32, one face of which forms the interior surface SI, and a plurality of acoustic elements 34 positioned in the cellular panel 30. Thus, the porous layer 28 is pressed against a first face 30.1 of the cellular panel 30 and the reflective layer 32 is pressed against a second face 30.2 of the cellular panel 30, on the opposite side from the first face 30.1.

The cellular panel 30 comprises a plurality of cells 36 in the form of a hollow tube that opens out at the first and second faces 30.1, 30.2 of the cellular panel 30. The cells 36 are juxtaposed with one another and separated by partitions 38. Thus, each cell is delimited by peripheral partitions 38.

Regardless of the embodiment, the acoustic absorption structure 26 comprises at least one acoustic element 34 positioned in a cell 36 of the cellular panel 30.

According to one configuration, the cellular panel 30 is a honeycomb structure, the cells having hexagonal sections. Of course, the invention is not limited to this embodiment, and the cells may have square, rectangular or octagonal sections or the like.

Figure 3:
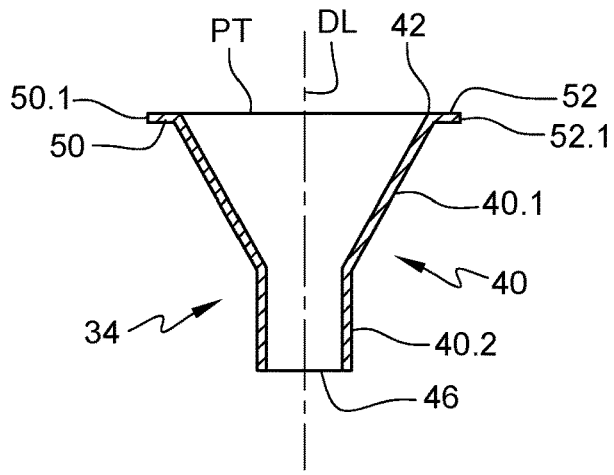
FIG. 3 is a cross section through an acoustic element illustrating one embodiment of the invention.
Figure 4:
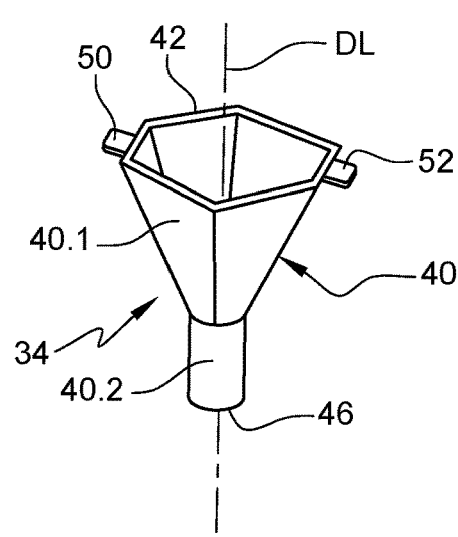
FIG. 4 is a perspective view of the acoustic element shown in FIG. 3.
Figure 5:
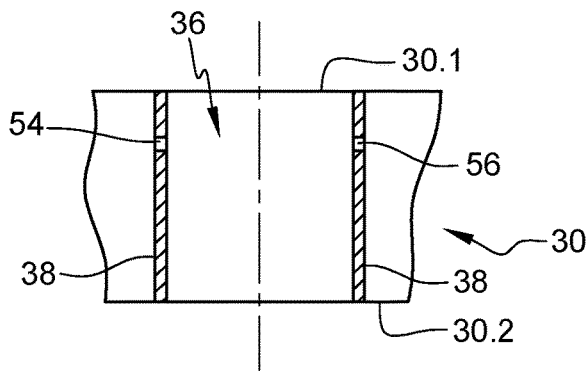
FIG. 5 is a cross section through a cell of a cellular panel illustrating one embodiment of the invention.
Figure 6:
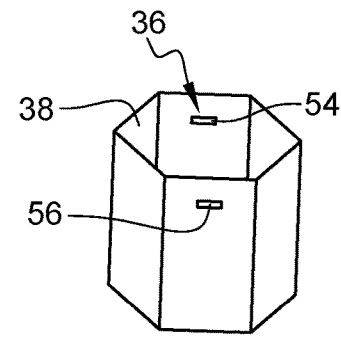
FIG. 6 is a perspective view of the cell shown in FIG. 5.

As illustrated in FIGS. 3 and 4, each acoustic element 34 comprises a conical or frustoconical body 40 which has a first peripheral edge 42 configured to cooperate with the peripheral partitions 38 of the cell 36 in which the acoustic element 34 is positioned. Thus, the body 40 separates the cell 36 into a first cavity 44.1 in contact with the porous layer 28 and into a second cavity 44.2 in contact with the reflective layer 32, as illustrated in FIG. 7.

The first peripheral edge 42 is positioned in a transverse plane PT. The longitudinal direction DL is perpendicular to the transverse plane, centered approximately with respect to the first peripheral edge 42. A radial direction is a direction perpendicular to the longitudinal direction DL. When the acoustic element 34 is positioned in a cell 36, the longitudinal direction DL is parallel to the partitions 38.

The body 40 comprises at least one acoustic orifice 46 for placing the first and second cavities 44.1, 44.2 in communication. This acoustic orifice 46 is dimensioned in accordance with the desired acoustic characteristics.

According to one configuration, the first peripheral edge 42 may be circular, hexagonal or the like. As illustrated in FIG. 4, the first peripheral edge 42 has a hexagonal shape substantially identical to the section of the cells 36.

According to one configuration, the body 40 is funnel-shaped and comprises a first, frustoconical part 40.1 and a second, tubular part 40.2 continuing the first, frustoconical part 40.1.

As illustrated in FIG. 3, the body 40 has a substantially constant thickness.

According to one feature, each acoustic element 34 comprises at least two radial tongues 50, 52, protruding with respect to the first peripheral edge 42, which extend in a radial direction.

These radial tongues 50, 52 make it easier to position and orient the acoustic element 34 in the cell 36.

Each radial tongue 50, 52 has a free end 50.1, 52.1. The radial tongues are positioned such that the free ends 50.1, 52.1 of at least two radial tongues 50, 52 are separated by a distance greater than the section of the cell 36 in which the acoustic element 34 is positioned.

According to one configuration, the radial tongues 50, 52 are positioned at the first peripheral edge 42. Each of the radial tongues 50, 52 is flat and positioned in the transverse plane PT.

According to one embodiment, the acoustic element 34 comprises only two, diametrically opposite, radial tongues 50, 52.

Each cell 36 accommodating an acoustic element 34 comprises, for each radial tongue 50, 52, a slot 54, 56 designed to receive a radial tongue 50, 52. These slots 54, 56 pass through the partitions 38 separating the cells 36.

According to one configuration, each slot 54, 56 has a rectangular shape.

The slots 54, 56 intended to receive the radial tongues 50, 52 of one and the same acoustic element 34 are positioned in one and the same transverse plane, which is parallel to the first and second faces 30.1, 30.2 of the cellular panel 30.

When the acoustic element comprises two diametrically opposite radial tongues 50, 52, the cell 36 receiving the acoustic element 34 comprises two diametrically opposite slots 54, 56 for the latter.

As illustrated in FIGS. 9 to 13, when first and second adjacent cells 36.1, 36.2 accommodate first and second acoustic elements 34, the latter are offset in the longitudinal direction DL and the slots 54.1, 56.1 of the first cell 36.1 are offset in the longitudinal direction DL with respect to the slots 54.2, 56.2 of the second cell 36.2.

Figure 8:
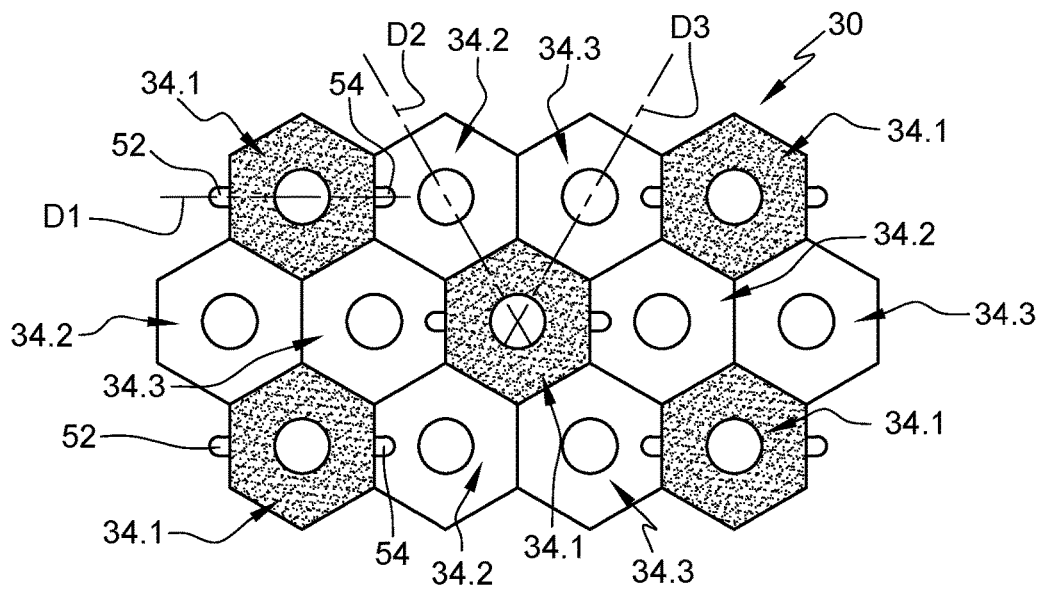
FIG. 8 is a top view of a cellular panel of an acoustic absorption structure in which acoustic elements, as illustrated in FIG. 3, are positioned.
Figure 9:
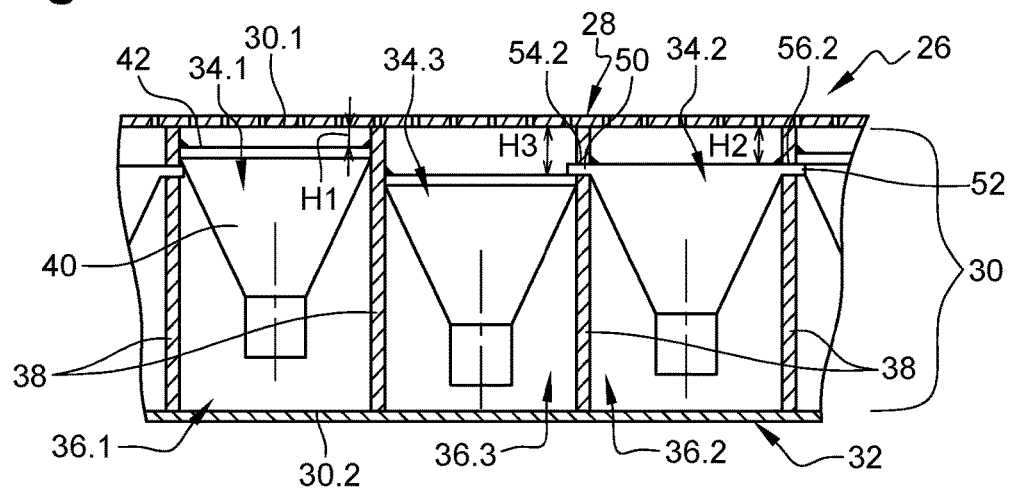
FIG. 9 is a cross section through an acoustic absorption structure illustrating one embodiment of the invention.

According to one configuration, shown in FIGS. 8 and 9, the cellular panel 30 is a honeycomb with cells 36.1, 36.2, 36.3 having a hexagonal section and the acoustic absorption structure 26 comprises acoustic elements 34.1, 34.2, 34.3 in each cell 36.1, 36.2, 36.3 in at least one zone of the cellular panel 30.

According to this configuration, the acoustic absorption structure 26 comprises a first set of acoustic elements 34.1, a second set of acoustic elements 34.2 and a third set of acoustic elements 34.3, the acoustic elements 34.1, 34.2, 34.3 being positioned such that the acoustic elements 34.1, 34.2, 34.3 of one and the same set are not positioned in adjacent cells.

The acoustic elements 34.1, 34.2, 34.3 of the different sets are identical and comprise for example two diametrically opposite radial tongues 50, 52. The acoustic elements 34.1, 34.2, 34.3 of one and the same set are all positioned at the same height and have radial tongues 50, 52 oriented in the same direction. In addition, the acoustic elements 34.1, 34.2, 34.3 of two different sets are positioned at different heights and their radial tongues 50, 52 are oriented in different directions.

Thus, as illustrated in FIGS. 8 and 9, the acoustic elements 34.1 of the first set are positioned at a first height H1 and their radial tongues 50, 52 are oriented in a first direction D1. The acoustic elements 34.2 of the second set are positioned at a second height H2 and their radial tongues 50, 52 are oriented in a second direction D2. The acoustic elements 34.3 of the third set are positioned at a third height H3 and their radial tongues 50, 52 are oriented in a third direction D3.

Figure 10:
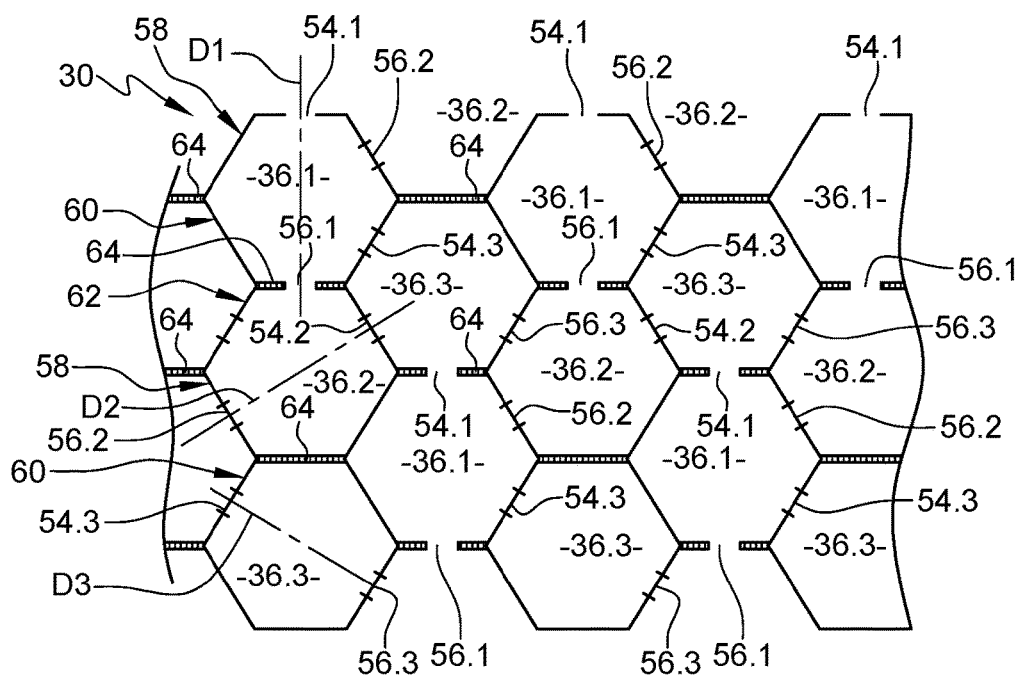
FIG. 10 is a top view of the cellular panel shown in FIG. 8 without the acoustic elements.
Figure 11:
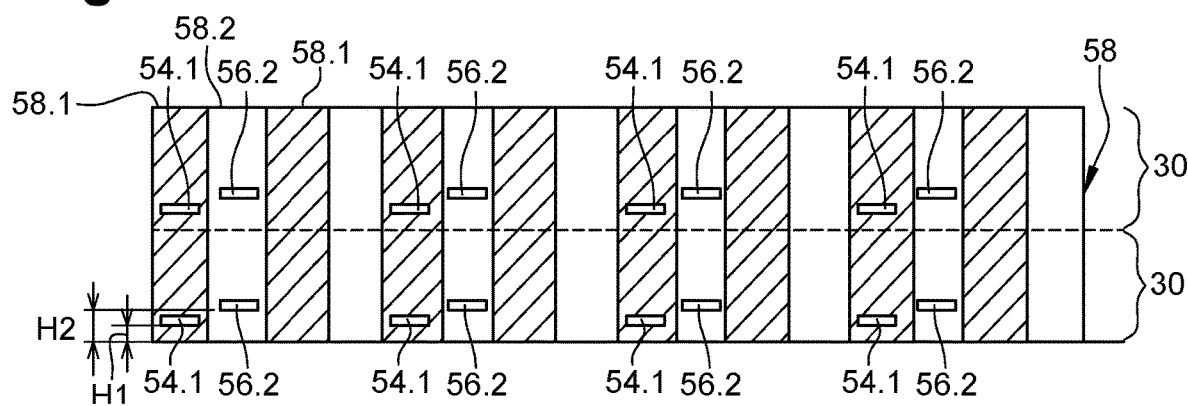
FIG. 11 is a side view of a first strip of material used to make the cellular panel shown in FIG. 10.
Figure 12:
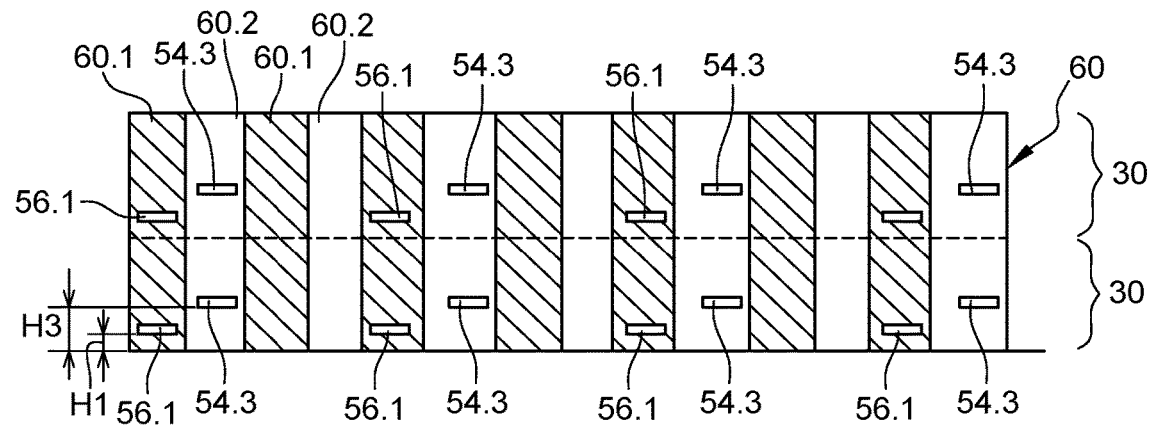
FIG. 12 is a side view of a second strip of material used to make the cellular panel shown in FIG. 10.
Figure 13:
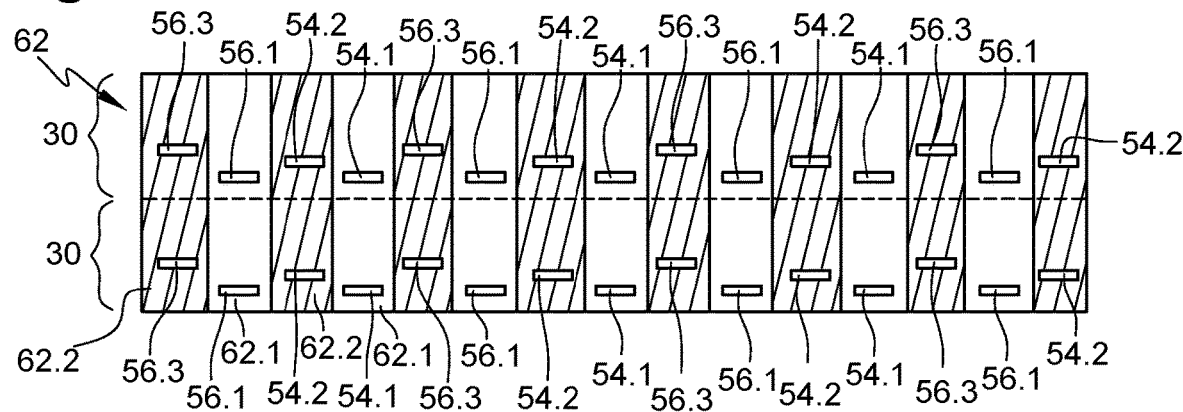
FIG. 13 is a side view of a third strip of material used to make the cellular panel shown in FIG. 10.

In addition, as illustrated in FIG. 10, the acoustic panel 30 comprises a first category of cells 36.1 that are intended to accommodate the acoustic elements 34.1 of the first set, a second category of cells 36.2 that are intended to accommodate the acoustic elements 34.2 of the second set and a third category of cells 36.3 that are intended to accommodate the acoustic elements of the third set.

As illustrated in FIGS. 9 to 13, the slots 54.1, 56.1 of the cells 36.1 of the first category are positioned substantially at the first height H1 and oriented in the first direction D1. The slots 54.2, 56.2 of the cells 36.2 of the second category are positioned substantially at the second height H2 and oriented in the second direction D2. The slots 54.3, 56.3 of the cells 36.3 of the third category are positioned substantially at the third height H3 and oriented in the third direction D3.

Figure 14:
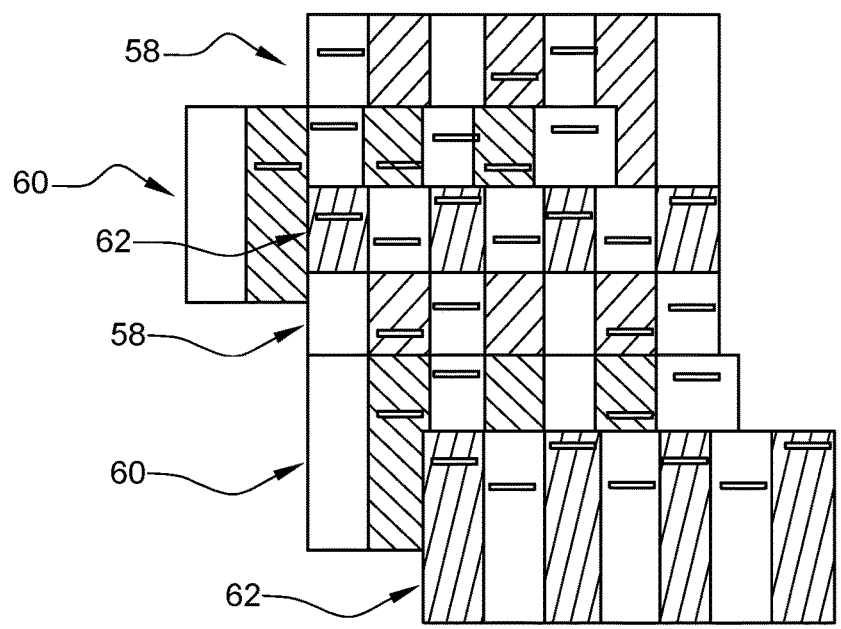
FIG. 14 is a schematic depiction of a stack of the first, second and third strips of material for making the cellular panel shown in FIG. 10.

According to one embodiment, as illustrated in FIGS. 9 to 14, the cellular panel 30 is obtained by alternately stacking first, second and third strips of material 58, 60, 62 (shown in FIGS. 11, 12 and 13, respectively), as illustrated in FIG. 14, which are connected together at zones 64 in order to obtain, after expansion, a cellular panel 30, as illustrated in FIG. 10.

One and the same strip of material 58, 60, 62 can be used to make one or more cellular panels 30. By way of example, the strips of material 58, 60, 62 shown in FIGS. 11 to 13 make it possible to obtain two cellular panels 30.

Each strip of material 58, 60, 62 alternately comprises connecting zones 58.1, 60.1, 62.1 and free zones 58.2, 60.2, 62.2.

The slots 54.1, 54.2, 54.3, 56.1, 56.2, 56.3 are cut out of the strips of material 58, 60, 62, when the latter are laid flat before being stacked and connected together. They are cut out using any suitable cutting method, such as machining, punching or the like.

According to one configuration, the first strip of material 58 (shown in FIG. 11) comprises a first slot 54.1, 56.1 intended for a radial tongue 50, 52 of an acoustic element 34.1 of the first set in a first, connecting zone 58.1, a second slot 56.2 intended for a radial tongue 50, 52 of an acoustic element 34.2 of the second set in a second, free zone 58.2, a third, connecting zone and fourth, free zone not comprising any slot. This succession of first, second, third and fourth connecting and free zones, which are or are not provided with a slot, is repeated.

The second strip of material 60 (shown in FIG. 12) comprises a first slot 54.1, 56.1 intended for a radial tongue 50, 52 of an acoustic element 34.1 of the first set in a first, connecting zone 60.1, a second slot 54.3 intended for a radial tongue 50, 52 of an acoustic element 34.3 of the third set in a second, free zone 60.2, a third, connecting zone and fourth, free zone not comprising any slot. This succession of first, second, third and fourth connecting and free zones, which are or are not provided with a slot, is repeated.

The third strip of material 62 (shown in FIG. 13) comprises a slot 54.2 intended for a radial tongue 50, 52 of an acoustic element 34.2 of the second set in a first, free zone 62.2, a slot 54.1, 56.1 intended for a radial tongue 50, 52 of an acoustic element 34.1 of the first set in a second, connecting zone 62.1, a slot 56.3 intended for a radial tongue 50, 52 of an acoustic element 34.3 of the third set in a third, free zone 62.2, a slot 54.1, 56.1 intended for a radial tongue 50, 52 of an acoustic element 34.1 of the first set in a fourth, connecting zone 62.1. This succession of first, second, third and fourth connecting and free zones, which are provided with a slot, is repeated.

The height H of the strips of material 58, 60, 62 intended for a cellular panel, and the first, second and third heights H1, H2, H3 of the slots 54.1, 54.2, 54.3, 56.1, 56.2, 56.3 are determined in accordance with the desired acoustic characteristics.

Subsequently, the strips of material 58, 60, 62 are stacked one on top of another by positioning them such that the slots 54.1, 56.1 positioned in the connecting zones 58.1, 60.1, 62.1 coincide.

Once they have been correctly positioned, the strips of material 58, 60, 62 are connected by any suitable method, such as welding for metal sheets or adhesive bonding for sheets known as aramid paper, for example. Once they have been correctly connected, the strips of material 58, 60, 62 are expanded so as to obtain the cellular panel 30 shown in FIG. 10.

Each acoustic element 34 is configured to be able to deform elastically in order to be introduced into one of the cells 36 until the radial tongues 50, 52 are accommodated in the slots 54, 56, as illustrated in FIG. 7.

According to one mode of operation, each acoustic element 34 is produced by injection-molding, molding or any other analogous method in terms of costs and production rate.

The acoustic elements 34 are force-fitted in the cells 36 and are immobilized when their radial tongues 50, 52 are accommodated in the slots 54, 56 of the cellular panel 30.

This fitting step can be automated with the aid of a robot.

The acoustic elements 34 can be fitted before or after the cellular panel 30 is formed.

As illustrated in FIG. 7, the acoustic absorption structure 26 comprises, for each acoustic element 34, a bead 66 which extends along the first peripheral edge 42 so as to achieve not only sealing between each acoustic element 34 and the peripheral partitions 38 of the cells 36 but also a strong connection between each acoustic element 34 and the cellular panel 30. This bead 66 may be a mastic or a resin.

Thus, each acoustic element 34 is held in its cell 36 by deposition of mastic, of an adhesive, of a bead of glue before, during or after the positioning of the acoustic element 34.

This step of depositing each bead 66 can be automated with the aid of a robot.

The method for manufacturing the acoustic absorption structure 26 comprises a step of manufacturing acoustic elements 34 provided with at least two radial tongues 50, 52, a step of manufacturing a cellular panel 30 provided with slots 54, 56 configured to accommodate the radial tongues 50, 52 of each acoustic element 34, a step of force-fitting each acoustic element 34 in one of the cells 36 of the cellular panel 30 provided with slots 54, 56 until the radial tongues 50, 52 are accommodated in the slots 54, 56.

The manufacturing method comprises a step of depositing a bead 66 for each acoustic element 34 in order to obtain a satisfactory connection between the acoustic element 34 and the peripheral partitions 38 delimiting the cell 36 receiving the acoustic element 34.

According to one configuration, the method for manufacturing the acoustic absorption structure 26 comprises steps of stacking, connecting and expanding the strips of material 58, 60, 62 in order to obtain the cellular panel 30. Beforehand, the method comprises a step of cutting out the slots 54.1, 54.2, 54.3, 56.1, 56.2, 56.3 in the laid-flat strips of material 58, 60, 62 before they are stacked and connected together.

Once the acoustic elements 34 have been fitted in the cellular panel 30, the method for manufacturing the acoustic absorption structure 26 comprises at least one step of joining the porous layer 28 and reflective layer 32 to the cellular panel 30 equipped with the acoustic elements 34.

This manufacturing method makes it possible to use robots to fit the acoustic elements 34 in the cellular panel 30 while limiting the on-board mass, each acoustic element 34 comprising only one element, rather than two, delimiting an acoustic chamber between one another.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing an acoustic absorption structure comprising:

a cellular panel having first and second faces and cells delimited by peripheral partitions, a porous layer positioned at the first face of the cellular panel, a reflective layer, a plurality of acoustic elements, each positioned in one of the cells of the cellular panel, each acoustic element having a body which has a first peripheral edge configured to cooperate with the peripheral partitions of the cell in which the acoustic element is positioned to divide the cell into two cavities, the body having at least one acoustic orifice for placing the two cavities in communication, wherein the body of each acoustic element comprises at least two radial tongues, protruding from the first peripheral edge, which tongues extend in a radial direction substantially parallel to the first face of the cellular panel;

wherein each cell accommodating an acoustic element comprises, for each radial tongue, a slot configured to receive the radial tongue, and wherein the method for manufacturing the acoustic absorption structure comprises:

manufacturing acoustic elements provided with at least two radial tongues, manufacturing a cellular panel provided with slots configured to accommodate the radial tongues of each acoustic element, force-fitting each acoustic element into one of the cells of the cellular panel until the radial tongues are accommodated in the slots, wherein the acoustic elements positioned in two adjacent cells are offset with respect to one another in a longitudinal direction perpendicular to the first face of the cellular panel, wherein the cells have hexagonal sections, and wherein each acoustic element comprises two diametrically opposite radial tongues, wherein the acoustic absorption structure comprises first, second and third sets of acoustic elements, the acoustic elements of one and the same set all being positioned at the same height and having radial tongues oriented in the same direction, the acoustic elements of two different sets being positioned at different heights and their radial tongues being oriented in different directions, and, the acoustic elements being positioned such that the acoustic elements of one and the same set are not positioned in adjacent cells.

2. The method for manufacturing an acoustic absorption structure as claimed in claim 1, wherein the method further comprises depositing a bead connecting the first peripheral edge and the peripheral partitions of the cell for each acoustic element.

3. The method for manufacturing an acoustic absorption structure as claimed in claim 1, wherein the method further comprises cutting slots in laid-flat strips of material and then stacking, connecting and expanding the strips of material to obtain the cellular panel.

4. An acoustic absorption structure comprising:

a cellular panel having first and second faces and cells delimited by peripheral partitions, a porous layer positioned at the first face of the cellular panel, a reflective layer, a plurality of acoustic elements each positioned in one of the cells of the cellular panel, each acoustic element having a body that has a first peripheral edge configured to cooperate with the peripheral partitions of the cell in which the acoustic element is positioned in order to divide the cell into two cavities, the body having at least one acoustic orifice for placing the two cavities in communication, wherein the body of each acoustic element comprises at least two radial tongues, protruding from the first peripheral edge, which extend in a radial direction substantially parallel to the first face of the cellular panel, and wherein each cell accommodating an acoustic element comprises, for each radial tongue, a slot configured to accommodate one of the radial tongues of the acoustic element, wherein the cells have hexagonal sections, wherein each acoustic element comprises two diametrically opposite radial tongues, and, wherein the acoustic absorption structure further comprises first, second and third sets of acoustic elements, the acoustic elements of one and the same set all being positioned at the same height and having radial tongues oriented in the same direction, the acoustic elements of two different sets being positioned at different heights and their radial tongues being oriented in different directions, the acoustic elements being positioned such that the acoustic elements of one and the same set are not positioned in adjacent cells.

5. The acoustic absorption structure as claimed in claim 4, wherein the acoustic absorption structure comprises, for each acoustic element, a bead connecting the first peripheral edge and the peripheral partitions of the cell.

6. The acoustic absorption structure as claimed in claim 4, wherein the acoustic elements positioned in two adjacent cells are offset with respect to one another in a longitudinal direction perpendicular to the first face of the cellular panel.

* * * * *